(12) United States Patent
Suzuyama et al.

(10) Patent No.: US 10,150,190 B2
(45) Date of Patent: Dec. 11, 2018

(54) PROCESSING MACHINE LINE

(71) Applicant: FUJI CORPORATION, Chiryu (JP)

(72) Inventors: Shigefumi Suzuyama, Toyota (JP);
Kazuya Furukawa, Chiryu (JP);
Masashi Ogawa, Toyota (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 15/028,214

(22) PCT Filed: Oct. 18, 2013

(86) PCT No.: PCT/JP2013/078295
§ 371 (c)(1),
(2) Date: Apr. 8, 2016

(87) PCT Pub. No.: WO2015/056339
PCT Pub. Date: Apr. 23, 2015

(65) Prior Publication Data
US 2016/0236308 A1    Aug. 18, 2016

(51) Int. Cl.
*B23Q 1/00*    (2006.01)
*B23Q 37/00*    (2006.01)
*B23Q 7/14*    (2006.01)

(52) U.S. Cl.
CPC ............. *B23Q 1/0045* (2013.01); *B23Q 7/14* (2013.01); *B23Q 37/007* (2013.01)

(58) Field of Classification Search
CPC .................... G05B 19/41815; G05B 19/00
See application file for complete search history.

(56) References Cited

U.S. PATENT DOCUMENTS

| 4,304,001 | A | * | 12/1981 | Cope | ................. | G05B 19/0428 |
| | | | | | | 340/2.9 |
| 4,564,913 | A | * | 1/1986 | Yomogida | ............ | G05B 19/052 |
| | | | | | | 700/112 |
| 4,841,431 | A | * | 6/1989 | Takagi | ............. | G05B 19/41815 |
| | | | | | | 700/82 |

(Continued)

FOREIGN PATENT DOCUMENTS

| JP | 5-324037 A | 12/1993 |
| JP | 6-63851 A | 3/1994 |

(Continued)

OTHER PUBLICATIONS

International Search Report dated Jan. 21, 2014, in PCT/JP2013/078295 Filed Oct. 18, 2013.

*Primary Examiner* — Will Fridie, Jr.
(74) *Attorney, Agent, or Firm* — Oblon, McClelland, Maier & Neustadt, L.L.P.

(57) ABSTRACT

There is provided a processing machine line in which it is possible to confirm predetermined information on one machine tool at one time in a plurality of screens, a plurality of machine tools are disposed being lined up, respective control devices of the plurality of machine tools are connected to each other via a line concentrator, display units of the plurality of machine tools are connected to the control devices, and the display unit displays predetermined information on a machine tool on which the display unit is mounted out of the plurality of machine tools, and displays predetermined information on another machine tool.

7 Claims, 9 Drawing Sheets

(56) References Cited

U.S. PATENT DOCUMENTS

| | | | | |
|---|---|---|---|---|
| 5,404,288 A * | 4/1995 | McDunn | ............ | G05B 19/0421 |
| | | | | 700/112 |
| 5,914,880 A * | 6/1999 | Yasojima | ................ | G06F 19/00 |
| | | | | 700/108 |
| 6,438,444 B1 * | 8/2002 | Mizuno | ............ | G05B 19/41845 |
| | | | | 318/567 |
| 6,463,352 B1 * | 10/2002 | Tadokoro | ........... | G05B 19/4187 |
| | | | | 700/159 |
| 6,606,524 B1 * | 8/2003 | Byun | ................ | G05B 19/4185 |
| | | | | 700/121 |
| 8,417,363 B2 * | 4/2013 | Erlandsson-Warvelin | .................. | |
| | | | | B25J 9/1694 |
| | | | | 700/20 |

FOREIGN PATENT DOCUMENTS

| | | |
|---|---|---|
| JP | 11-65642 A | 3/1999 |
| JP | 2013-048304 A | 3/2013 |

\* cited by examiner

PROCESSING MACHINE LINE

TECHNICAL FIELD

The present disclosure relates to a processing machine line which is configured by a plurality of machine tools, and in particular relates to a processing machine line which is able to display predetermined information on one machine tool on an operation panel of another machine tool.

BACKGROUND ART

In the machine tool such as an NC lathe, a machine operation check is performed according to a sequence program by, for example, an operator. At that time, a ladder diagram screen is displayed on an operation panel of the machine tool, and ON/OFF switching of a contact point is performed based on the ladder diagram. Meanwhile, since confirmation of an output state that occurs due to such switching is necessary, the operator switches the display of the operation panel to an I/O monitor screen. Then, first the operator performs the operation confirmation for operation by displaying an operation screen of each machine tool on an operation panel when performing the operation confirmation.

CITATION LIST

Patent Literature

PTL 1: JP-A-2013-048304
PTL 2: JP-A-05-324037

SUMMARY

Problem to be Solved

In this manner, an operator of a machine tool or the like displays a plurality of screens, and performs work while confirming each display screen, in some cases. However, in the machine tool in the related art, it is necessary to switch the operation panel screen each time. For this reason, it is necessary to frequently switch the operation panel screen display. Therefore, work efficiency is deteriorated, and the operator cannot view a plurality of screens at once, which is inconvenient. In this point, as a display technique, there is a multi-display function in which a plurality of screens are displayed so as to overlap each other, a split display function in which the screen is split into two screens, and the like. However, the multi-display function cannot be said to be effective since an overlapped screen cannot be viewed by the operator. In addition, with the split display function in which the screen is split into two, since the displayed screen is small, and an aspect ratio changes, the displayed screen is difficult for the operator to view.

Therefore, in order to solve the problem, the present disclosure has an object of providing a processing machine line in which it is possible to confirm predetermined information on one machine tool at one time in a plurality of screens.

Means for Solving the Problem

According to an aspect of the present disclosure, there is provided a processing machine line including a plurality of machine tools which are disposed being lined up, in which respective control devices of the plurality of machine tools are connected to each other via a line concentrator, display units of the plurality of machine tools are connected to the control devices, and the display unit displays predetermined information on a machine tool on which the display unit is mounted out of the plurality of machine tools and displays predetermined information on another machine tool.

Effects

According to the present disclosure, for example, in a first machine tool (one machine tool on which the display unit is mounted) out of the plurality of machine tools, predetermined information on the first machine tool can be displayed on a display unit of the first machine tool, and in a second machine tool other than the first machine tool (a machine tool other than the first machine tool), predetermined information on the first machine tool which is not the second machine tool, can be displayed on the display unit of the second machine tool. For this reason, when operating the first machine tool, the operator is able to confirm at one time predetermined information on the first machine tool which is displayed on both the display unit of the first machine tool and the display unit of the second machine tool, for example, a ladder diagram and an I/O monitor which relate to the first machine tool from respective display units.

DESCRIPTION OF EMBODIMENTS

Figure 1:
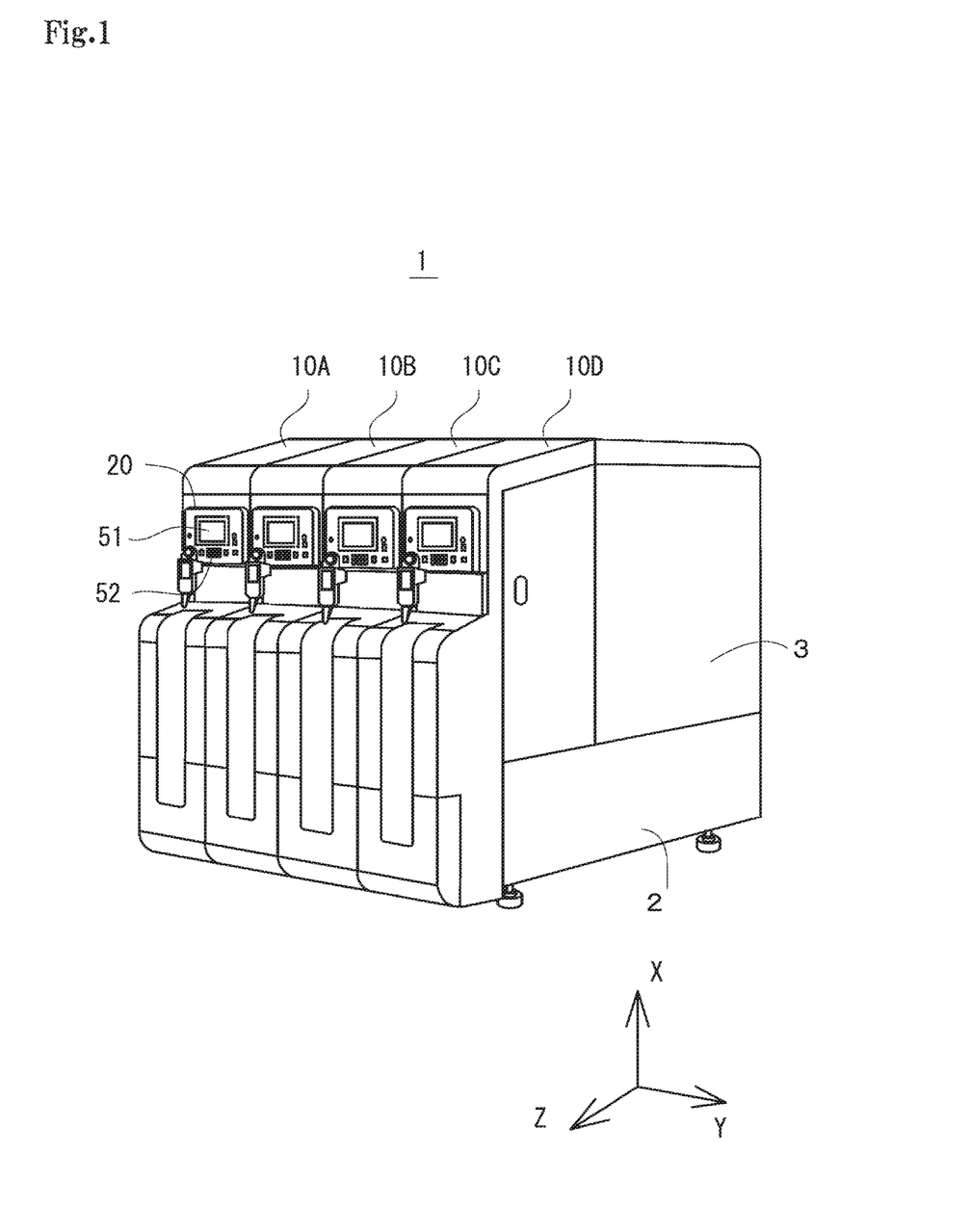
FIG. 1 is a perspective view illustrating one embodiment of a processing machine line.

Next, a processing machine line according to the present disclosure will be described below with reference to the embodiment and drawings. FIG. 1 is a perspective diagram illustrating the processing machine line of the present embodiment. In a processing machine line 1, four machine tools 10 (10A, 10B, 10C, and 10D) are mounted on a base 2. The four machine tools 10 are NC lathes all of the same shape, and the internal structure, and entire form and dimensions are the same. Then, as will be described later, control devices of each machine tool 10 are connected to each other using a line concentrator. In addition, an auto loader, which is not shown in the drawings, that conveys a workpiece with respect to each machine tool 10 is provided on the processing machine line 1.

Here, "processing machine line" refers to a machine tool group in which a plurality of machine tools that have a fixed relationship are disposed in proximity. As exemplified, the processing machine line 1 of the present embodiment is disposed in a state in which the four machine tools 10 are substantially in contact in a width direction (Y axis direction). However, in the processing machine line, the machine tools may be disposed to be separated from each other. In addition, as exemplified, other than being disposed in a straight line, for example, a gap on the rear side of each machine tool 10 may be widely disposed such that a front surface side is arc-shaped.

The machine tools 10 of the present embodiment has a feature that the entirety of the processing machine line 1 is very compact, because a width dimension of the machine tools 10 is narrow, and the machine bodies are disposed extremely close to each other. For this reason, an operation area for an operator who handles the processing machine line 1 is very small.

Figure 2:
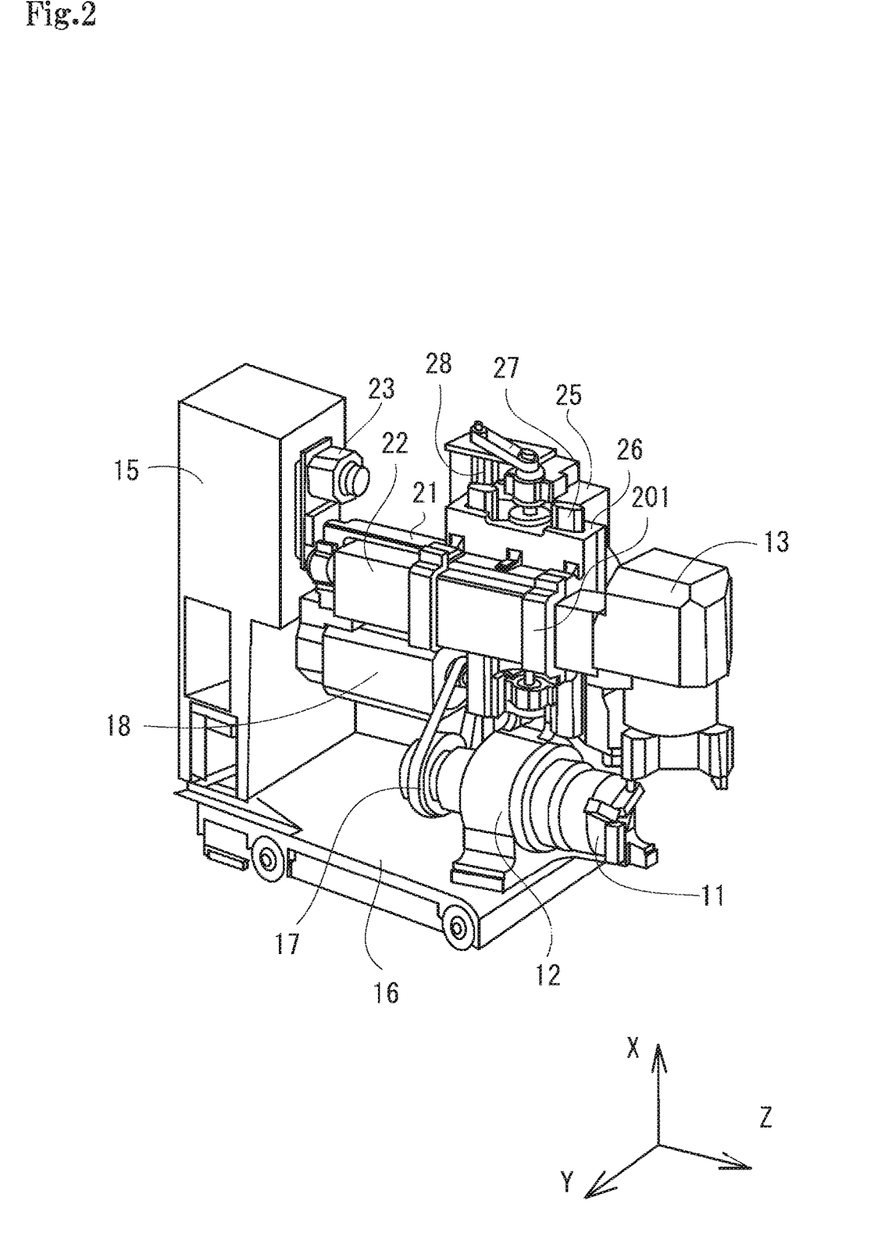
FIG. 2 is a perspective view illustrating an internal structure of a machine tool which configures the processing machine line.

The machine tools 10 are all covered by an exterior cover 3, and a processing section is internally provided. FIG. 2 is a perspective view indicating an internal structure of the machine tool 10. The machine tool 10 is a turret lathe that is provided with a turret in which a rotating tool such as an end mill or a drill, or a cutting tool such as a bit is held. The machine tool 10 is provided with a head stock 12 that is provided with a chuck 11 that grips a workpiece, a turret device 13 to which a tool is attached, and a control device 15 for controlling a Z-axis drive device and an X-axis drive device which drive the turret device 13 along a Z axis or an X axis, or a driving section, and the like.

Here, the Z axis is a horizontal axis which is parallel to a rotary shaft (main spindle) of the head stock 12 which rotates a gripped workpiece. The X axis is a movement axis which is orthogonal with respect to the Z axis and in which the tool of the turret device 13 advances and retreats with respect to the Z axis, and is a vertical direction. An X-axis direction is an up and down direction of the machine tool 10 and the processing machine line 1 which are indicated in FIG. 1.

The machine tool 10 is provided with a movable bed 16 that is provided with a wheel such that it is possible to move on the base 2, and the head stock 12 is fixed with respect to the movable bed 16. The head stock 12 is configured such that the chuck 11 and a main spindle side pulley 17 are integral to the main spindle which is supported so as to freely rotate, and rotation of a main spindle servomotor 18 is applied. Meanwhile, the turret device 13 is configured to be mounted on a Z-axis slide 22, and furthermore, the Z-axis slide 22 is mounted on an X-axis slide 26. On the Z-axis slide 22, the base 2 is fixed to the X-axis slide 26 which is able to be raised and lowered, and a guide 201 is formed on the base 2. Then, the Z-axis slide 22 is configured to be freely movable in the horizontal direction which is parallel to the Z axis by sliding within the base 2.

Since the Z-axis slide 22 is moved in a Z-axis direction in the Z-axis drive device, a ball screw drive system is adopted in which a rotation output of a Z-axis servo motor 23 is converted to linear motion. That is, the ball screw rotates due to the driving of the Z-axis servo motor 23, the rotary motion is converted to linear motion of a ball nut, and the Z-axis slide 22 is configured so as to move in a direction parallel to the Z axis. In this manner the Z-axis drive device is mounted on the base 2. A column 25 which stands beside the head stock 12 is fixed to the movable bed 16.

Two guides 27 which extend in the vertical direction on the head stock 12 side are provided in parallel in the column 25, and the X-axis slide 26 is attached to freely slide with respect to the guides 27. Since the X-axis slide 26 is able to be raised and lowered along the guides 27, and the rotation output of a motor is converted to a raising and lowering movement of the X-axis slide 26, the ball screw drive system is also adopted in the X-axis drive device. The ball screw is rotated by the driving of an X-axis servo motor 28, the rotary motion is converted to linear motion of the ball nut, and it is possible to raise and lower the X-axis slide 26. Then, the control device 15 for performing operation control or the like of the machine tool 10 in this manner is disposed on an end section (the rear of the machine tool 10) in the Z-axis direction of the movable bed 16.

The machine tool 10 which is configured in this manner is configured such that the column 25 stands close beside the head stock 12, and the X-axis slide 26 raises and lowers in the vertical direction. That is, the X axis of the machine tool 10 is vertical. For this reason, the Z-axis slide 22 which is fixed to the X-axis slide 26 is always positioned above the head stock 12. The machine tool 10 is configured such that the head stock 12, the Z-axis and the X-axis drive devices, and the turret device 13 are accommodated within the extremely narrow width dimension (dimension in a Y-axis direction). Furthermore, since the control device 15 is disposed so as to be accommodated within substantially the same dimensions, as described above, the width dimension of the machine tool 10 is configured to be narrow.

The machine tool 10 is configured such that it is possible to pull out an internal structure portion which is indicated in FIG. 2 in a front and back direction due to the movable bed 16 moving on the base 2. In a case of pulling out to the front, replacement of the tool, changeover accompanying workpiece change, and the like are performed, and in a case of pulling out to the back, replacement of the machine tool 10 is performed. In this manner, since the machine tool 10 is able to pull out with respect to the base 2, although the machine tools 10 are disposed close to each other, it is possible to easily perform operation of maintenance, changeover, replacement, and the like of each machine tool 10.

In the machine tool 10 with a small width dimension, an operation panel 20 is attached to the front surface section to match the height of the eye line of an operator. As shown in FIG. 1, the operation panel 20 is attached to all of the machine tools 10, and four operation panels 20 are continuously lined up in the entirety of the processing machine line 1. Since the width dimension of the machine tools 10 is narrow, the distance between each adjacent operation panel 20 is close, and not only one operation panel 20, but also an adjacent operation panel 20 is disposed so as to be able to be confirmed by the operator.

Figure 3:
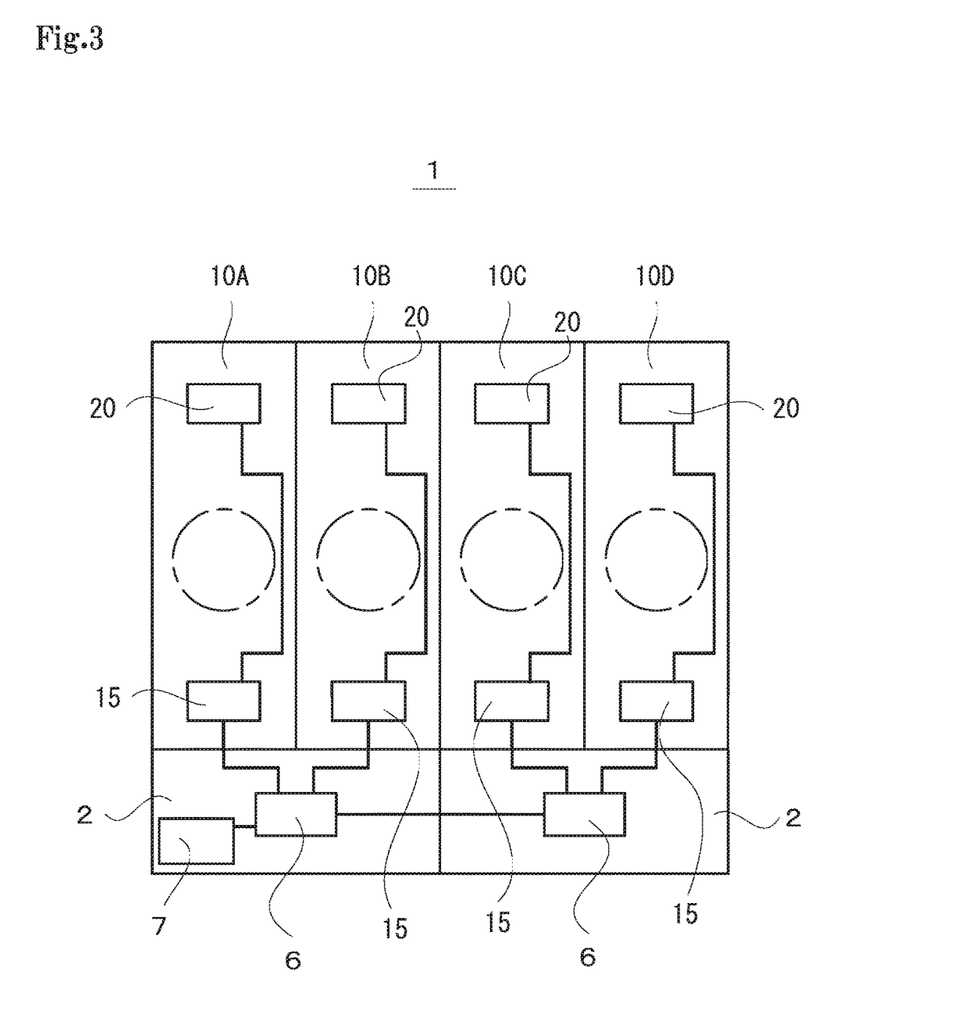
FIG. 3 is a diagram illustrating a relationship between machine tools in the processing machine line.

FIG. 3 is a diagram indicating a relationship between machine tools in the processing machine line 1. In one machine tool 10, the operation panel 20 is connected to the control device 15, it is possible to display predetermined information of the corresponding own machine tool 10 which is stored in a memory section of the control device 15 on a display 51, and the one machine tool 10 is configured such that a signal input is possible from an input section 52. In the processing machine line 1, two machine tools 10 are mounted with respect to one base 2, and the processing machine line 1 has a total of four machine tools 10. A hub 6 which is a line concentrator is provided in each base 2, and respective control devices 15 of two machine tools 10 (10A and 10B, 10C and 10D) are connected. Furthermore, the hubs 6 which are provided on each base 2 are connected to each other.

In such a processing machine line 1, the control devices 15 of the four machine tools 10 are connected to each other via the hub 6, and a local area network (LAN) is constructed. Consequently, in any machine tool 10 (for example, the machine tool 10A), on the display 51, it is possible to display the predetermined information which relates to the own machine tool 10 (10A), and it is also possible to display the predetermined information which relates to another machine tool 10 (for example, the machine tool 10B).

In the processing machine line 1, the auto loader which is a workpiece automatic conveyance device is assembled, and a conveyance control device 7 which is a drive control device is provided within one base 2. The conveyance control device 7 is also connected to the hub 6, and is connected to the control devices 15 of all of the machine tools 10. For this reason, the display 51 of any of the four machine tools 10 is also able to display the predetermined information which relates to the auto loader.

Figure 4:
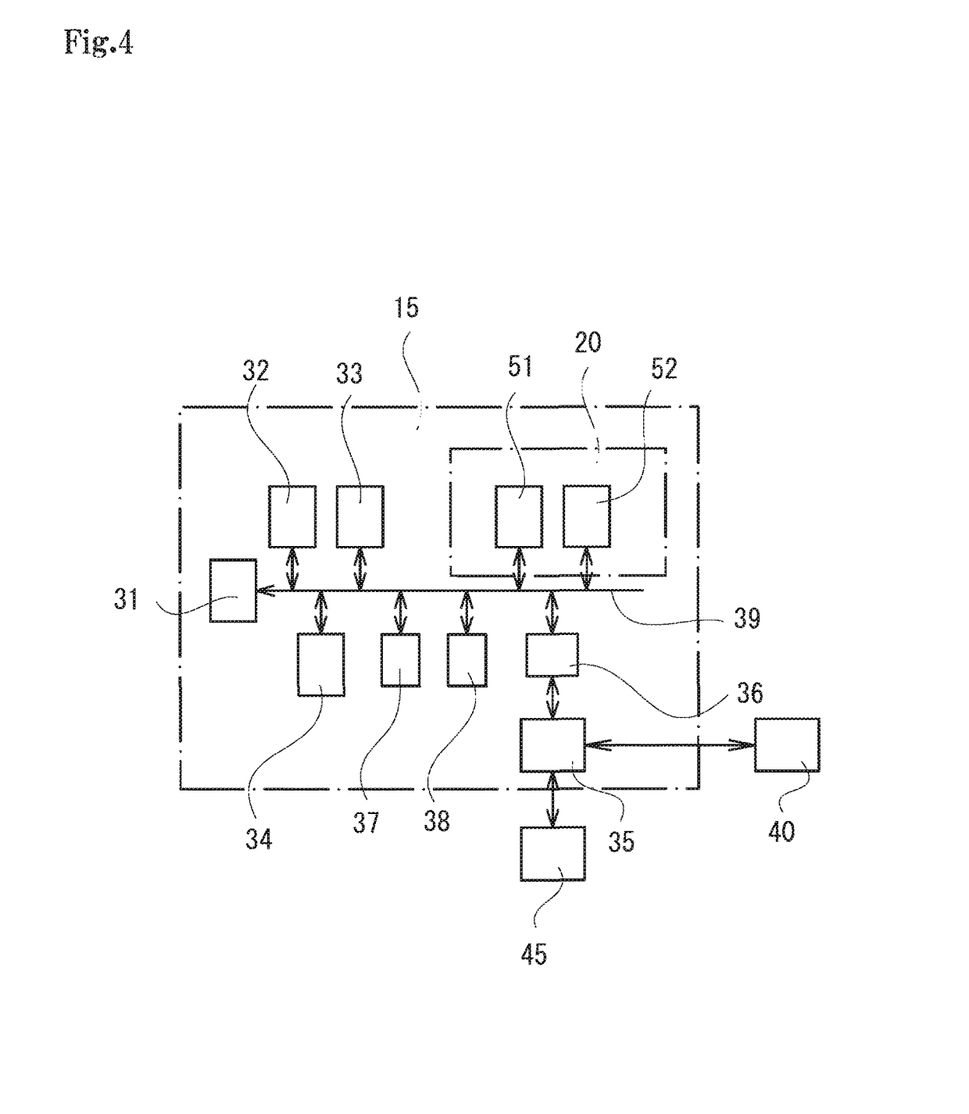
FIG. 4 is a block diagram representing a control system of the machine tool which configures the processing machine line.

Here, FIG. 4 is a block diagram which represents a control system of the machine tool 10. In the control section in which the control device 15 is set as the center, a microprocessor (CPU) 31, a ROM 32, a RAM 33, a non-volatile memory 34, an I/O unit 35, the operation panel 20, and the like are connected via a bus line 39. The CPU 31 integratedly controls all of the control sections, a system program, a control parameter, and the like which are executed by the CPU 31 are stored in the ROM 32, and calculation data, display data, and the like are temporarily stored in the RAM 33. In addition, the non-volatile memory 34 stores information which is necessary in a process which is performed by the CPU 31, and the sequence program of the machine tool 10, predetermined information such as a ladder diagram and the like which is displayed on the display 51 is stored. In addition, a display control program is also stored for executing the screen display using the operation panel 20 which will be described later. On the operation panel 20, the input section 52 is provided which is formed of an operation button and the like other than the display 51 as a display unit.

Then, in the control section, a programmable machine controller (PMC) 36 is provided which is connected to the I/O unit 35, and the machine tool 10 is controlled by the sequence program which is formed in a ladder format. Each function command of an M function, an S function, and a T function according to a processing program is converted to a signal which is necessary according to the sequence program, and an output is performed to a machine tool driving section 40 such as the head stock 12 and the turret device 13 from the I/O unit 35.

In the I/O unit 35, an auto loader 45 is connected to in addition to the machine tool driving section 40 such as the head stock, the Z-axis drive device, and the X-axis drive device which are major structures of the machine tool 10, and input and output of a control signal for controlling each driving section are performed. The auto loader 45 is provided with a loader driving section for driving a loader that grips and conveys the workpiece, an automatic door diving section for opening and closing an automatic door which is provided on a front surface side of the machine tool 10, and a jig driving section for operating a jig on which the workpiece is fixed. Then, a LAN interface 37 is connected to the bus line 39, and is in a state in which it is possible to communicate with another machine tool 10 via the hub 6. In addition, an external interface 38 for connecting to an external personal computer or the like is also provided.

In an NC machine tool such as a machining center, for example, an operation check of the machine is performed by the operator while viewing a sequence that is displayed on a screen of the display 51. The same applies to the machine tool 10 of the present embodiment. As sequence display, the ladder diagram is used which expresses the sequence program using a coil and contact of the relay. In the operation check, the operator displays the predetermined information such as a ladder diagram of the corresponding machine tool 10 with respect to the display 51, and the operation check is performed while the screen is confirmed.

During the operation check, other than the ladder diagram, each individual piece of operation information and an I/O monitor are utilized. For this reason, the operator displays a ladder diagram screen, each individual operation screen, and an I/O monitor screen on the display 51. In detail, first, each individual operation screen is displayed on the display 51. In a case where the operator performs a predetermined operation in the machine tool 10 from each individual operation screen, the operator is able to confirm how ON/OFF of the signal is actually changed. That is, it is possible to carry out operation confirmation of the machine tool 10 using each individual operation screen. Next, in order to perform circumstance confirmation, the display 51 is switched to the display of the ladder diagram. The operator performs driving of the machine tool 10 by operating an operation switch manually while confirming the ladder diagram screen. Then, the display 51 performs switching to the I/O monitor screen. The operator confirms in what manner the ON/OFF state of the signal is in each operation from the I/O monitor screen.

In this manner, in a case where an operation check or the like is performed on the machine tool 10, the operator has to confirm a plurality of pieces of information, and in order to display the information which corresponds to each time, the screen of the display 51 has to be switched. However, since work which is performed while switching the screen is inefficient, it is desirable for it to be possible to confirm simultaneous display of the screen which indicates a plurality of pieces of information. Here, work which is performed by displaying predetermined information on the display 51 is performed in not only the operation check, but also in processing correction and the like with respect to the workpiece. Also at that time, for example, it is necessary to simultaneously confirm a plurality of screens such as a screen on which the processing program is indicated, a screen on which a macro variable is displayed, and a screen on which the processing path is represented.

Therefore, there is a display method for a plurality of screens such as indicated in an example of the related art, but displaying a plurality of screens on one display is not effective. In this point, in the processing machine line 1, a plurality of machine tools 10 are disposed to be close, and are respectively provided with the display 51. Moreover, the LAN is constructed, and all of the machine tools 10 are configured such that the control devices 15 are able to communicate with each other using the hub 6. Therefore, in the present embodiment, when the predetermined information on each machine tool 10 is displayed in a ladder diagram or the like, in each machine tool 10, it is possible to not only display the own predetermined information on the display 51, but it is also possible to display predetermined information of another machine tool 10.

Here, concerning a processing machine line which is able to communicate between a plurality of processing machines, for example, it is possible to give the example of PTL 1 which the present applicant has already proposed. Here, the plurality of processing machines is disposed, and an electrical circuit board is assembled by mounting electrical components in order with respect to the circuit board. A control device is provided which stands on each processing machine, and the control devices are connected to each other using a communication device. Then, one processing machine is associated as a master, and the remaining processing machines are associated as slaves. Accordingly, in the processing machine line, information which relates to the electrical circuit board is supplied from the master processing machine to the slave processing machines, or circumstances of the corresponding own device itself are supplied from the slave processing machines to the master processing machine.

According to such a processing machine line of the related art, it is possible to acquire information on the slave processing machines from the display of the master processing machine. However, work efficiency is improved in the entirety of the processing machine line, but an effect of performing the operation check on the respective processing machines is not exhibited. It is possible to aggregate information only in the master processing machine, and it is not possible for the slave processing machines to actively acquire information. In this point, there is no master-slave relationship in the processing machine line 1 of the present embodiment, and it is possible to display the predetermined information on the other machine tools 10 on the display 51 in each of the machine tools 10.

Figure 5:
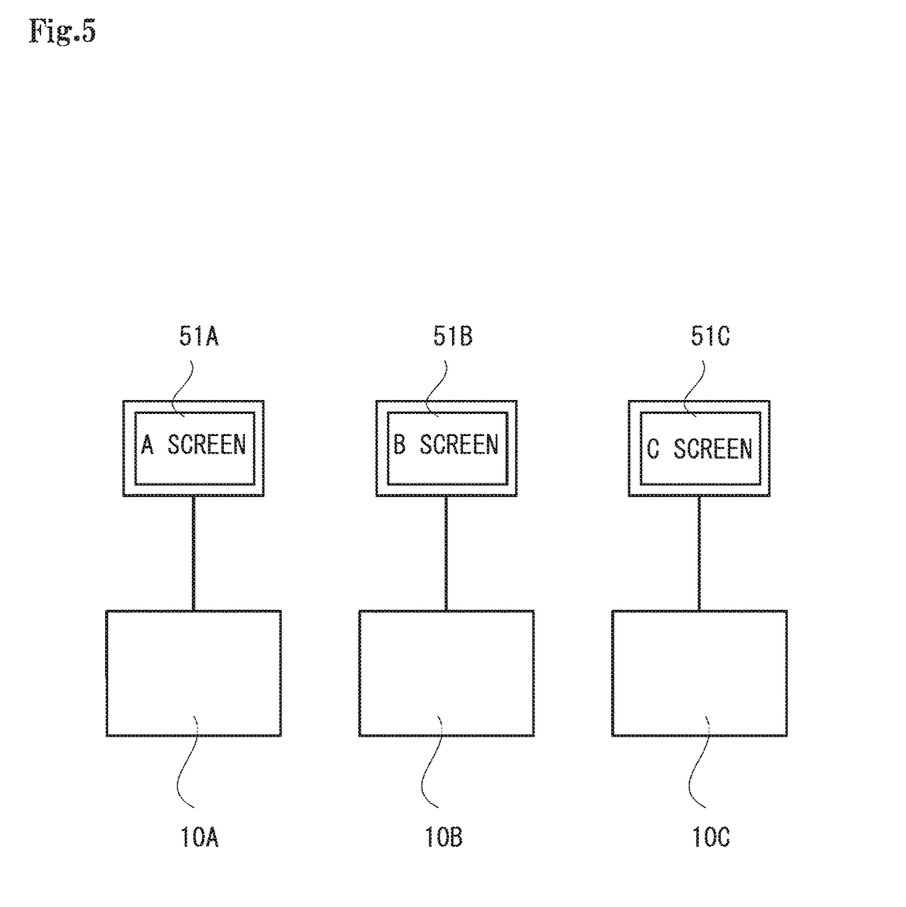
FIG. 5 is a diagram of a standard state which schematically illustrates an information source of predetermined information that is displayed on a display of the machine tool.

Therefore, next, a case where the operation check described above is performed in one machine tool 10B which configures the processing machine line 1 will be described in detail. FIG. 5 is a diagram of a standard state in which an information source of predetermined information that is displayed on the display 51 of the machine tool 10 is imaged. In the standard state, a screen (A screen) of the predetermined information on the machine tool 10A is displayed on a display 51A, a screen (B screen) of the predetermined information on the machine tool 10B is displayed on a display 51B, and a screen (C screen) of the predetermined information on the machine tool 10C is displayed on a display 51C. That is, the predetermined information of the own machine tool 10 on which the respective display 51 is mounted is displayed on the display 51.

Figure 6:
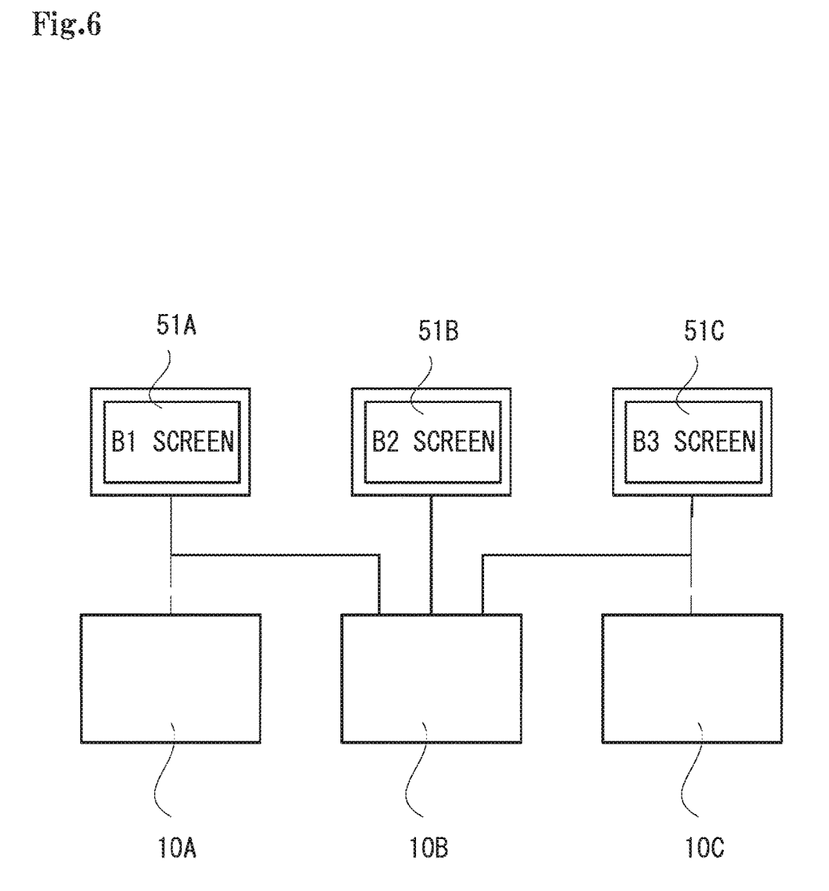
FIG. 6 is a diagram of an other-machine tool selection state which schematically illustrates an information source of predetermined information that is displayed on the display of the machine tool.

Then, in a case where the operation check is performed on the machine tool 10B, the displays 51A and 51C of both adjacent machine tools 10A and 10C are utilized. That is, as shown in FIG. 6, due to an other-machine tool selection operation which is indicated below, the screens of the displays 51A and 51C of the machine tools 10A and 10C are switched to the B screen which displays the predetermined information of the machine tool 10B. FIG. 6 is a diagram of an other-machine tool selection state in which an information source of predetermined information that is displayed on the display 51 of the machine tool 10 is imaged.

In the machine tool 10B which is the operation check target, according to ordinary operation, the own ladder screen (B2 image) is displayed on the display 51B. Then, in the machine tools 10A and 10C, the other-machine tool selection operation is performed by the operator, each individual operation screen (B1 screen) of the machine tool 10B is displayed in the left adjacent machine tool 10A, and the I/O monitor screen (B3 screen) of the machine tool 10B is displayed in the right adjacent machine tool 10C. That is, in the machine tool 10 in which the other-machine tool selection operation is performed, the own predetermined information is not displayed, but the predetermined information of the selected machine tool 10 is displayed on the display 51. Here, "left" and "right" refer to a direction which is viewed from the operator who stands in front of the processing machine line 1 that is indicated in FIG. 1 (the same below).

Figure 7:
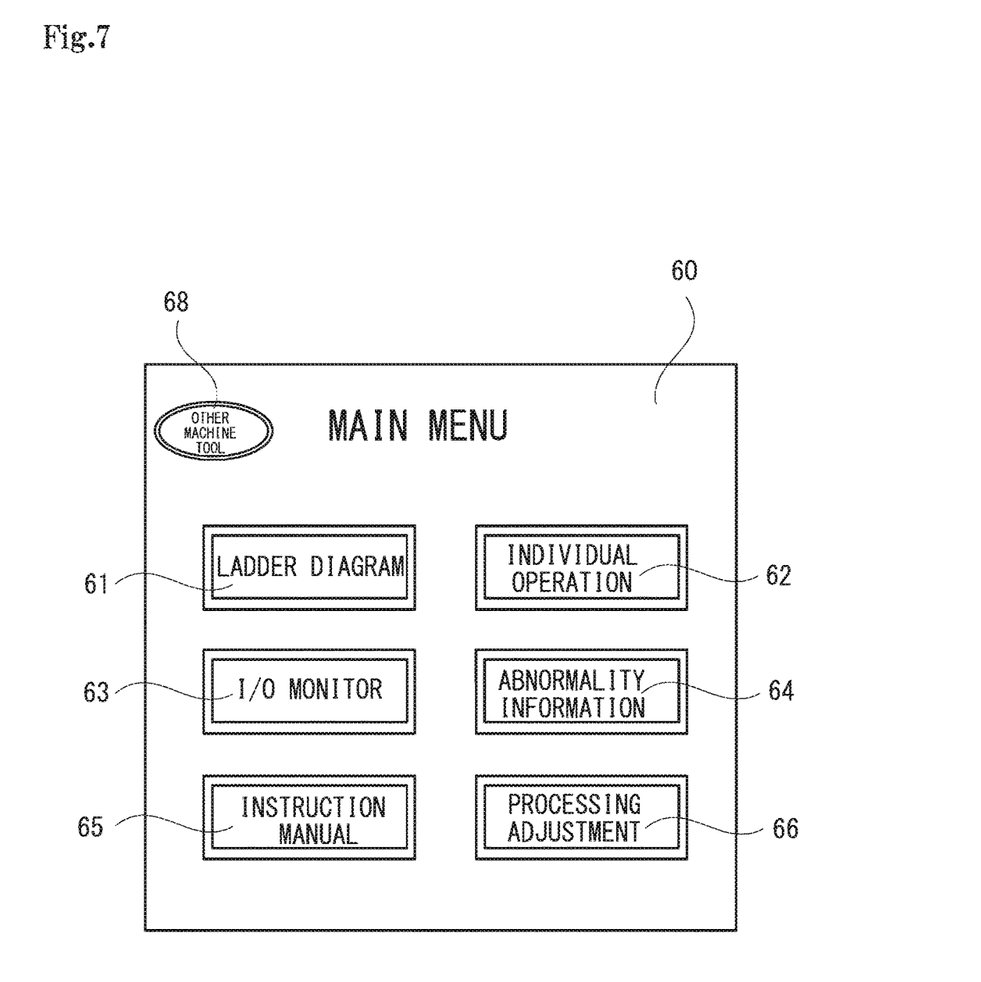
FIG. 7 is a diagram illustrating a main menu screen which is displayed on the display of the machine tool.

Such an other-machine tool selection operation is performed by operating the input section 52 of the operation panel 20 accompanying a screen which is displayed on the display 51 by the operator. In the machine tool 10, the operation screen which is displayed on the display 51 is hierarchically configured, and the screen of the predetermined information is displayed on the display 51 by a transition operation of the operator. FIG. 7 is a diagram indicating a main menu screen which is displayed on the display 51. A main menu screen 60 displays an initial screen on the display 51 of the machine tool 10.

A selection button for selecting one piece of information from a plurality of pieces of predetermined information which relates to the machine tool 10 is disposed on the main menu screen 60. In the case of the present embodiment, the predetermined information on the machine tool 10 is the ladder diagram, each individual piece of operation information, I/O monitor information, abnormality information, an instruction manual, or the like. Therefore, in order to select such predetermined information, each selection button of a ladder diagram button 61, each individual operation button 62, an I/O monitor button 63, an abnormality information button 64, an instruction manual button 65, and a processing adjustment button 66 is set on the main menu screen 60.

When one selection button is selected by the operator, a screen is transitioned to the lower hierarchy according to the corresponding selection button, and in a case of a plurality of hierarchies, further selection is performed toward the lower hierarchy. Then, the screen of corresponding predetermined information is displayed on the display 51. The selection of the selection button is performed by a button operation or the like of the input section 52 which is provided on the operation panel 20. Here, the display 51 may have a configuration of a touch panel type in which an input device is integral. Consequently, the operator is able to easily perform selection by directly touching the selection button for the screen.

Figure 8:
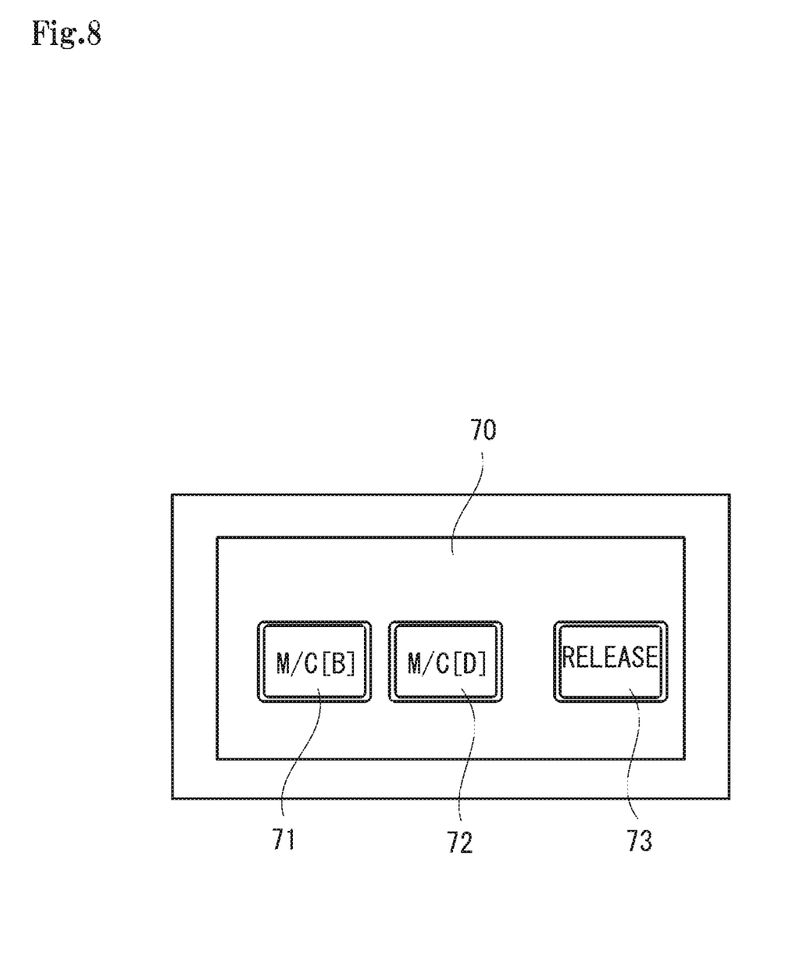
FIG. 8 is a diagram illustrating an other-machine tool selection screen which is displayed on the display of the machine tool.

Here, an other-machine tool selection button 68 for displaying the predetermined information on the other machine tool 10 is disposed on the main menu screen 60. Here, the predetermined information on the machine tool 10 (for example, the machine tool 10B) other than the machine tool 10 (for example, the machine tool 10C) which is operated by the operator is to be displayed on the display 51 of the operated machine tool 10. For example, in the machine tool 10C, in a case where the other-machine tool selection button 68 is selected by the operator, an other-machine tool selection screen 70 which is indicated in FIG. 8 is displayed on the display 51. Here, the other-machine tool selection screen 70 is positioned on the upper hierarchy of the main menu screen 60 which is the initial screen, and in a case where the other-machine tool selection button 68 is selected, the level transitions to the upper hierarchy and the screen is displayed.

On the other-machine tool selection screen 70, three buttons are disposed, other-machine tool setting buttons 71 and 72 for selecting the machine tools 10 which are positioned adjacently both left and right and a release button 73 for returning to the own main menu screen 60 are set. As exemplified, in a case where the other-machine tool selection screen 70 of the machine tool 10C, M/C (B) characters are displayed which indicate the machine tool 10B left adjacent to the other-machine tool setting button 71, and M/C (D) characters are displayed which indicate the machine tool 10D right adjacent to the other-machine tool setting button 72. Therefore, as long as the other-machine tool setting button 71 is set by the operator, the main menu screen 60 of the machine tool 10B is displayed on the display 51 of the machine tool 10C. Then, when the selection button such as the ladder diagram button 61 is selected by the operator as described above, the screen is transitioned to the screen on the lower hierarchy according to the operation button, and the screen of the predetermined information which relates to the machine tool 10B is displayed on the display 51 of the machine tool 10C.

On the other-machine tool selection screen 70, the two other-machine tool selection buttons 71 and 72 are disposed, but for the machine tools 10A and 10D which are positioned at the end of the processing machine line 1, there are no other machines on one side. For this reason, as long as there is the machine tool 10A, the other-machine tool selection button 71 which corresponds to the left side does not function as any display. Then, as long as there is the machine tool 10D, the other-machine tool selection button 72 which corresponds to the right side does not function as any display. However, the other-machine tool selection button may be three and not two. Since the processing machine line 1 is configured by four machine tools 10, it is possible to select the machine tool 10 other than the own machine tool using the other-machine tool selection button.

In the present embodiment, the other-machine tool selection screen 70 is provided on the upper hierarchy than the main menu screen 60 as described above. Then, during start up of the machine tool 10, the main menu screen 60 which is the lower hierarchy is configured to be displayed on the display 51 as the initial screen. Accordingly, in the ordinary operation which is performed by the operator, the screen is switched to the lower hierarchy with the main menu screen 60 as the origin. That is, when the screen is switched, the transition to the higher hierarchy means returning to the main menu screen 60. For this reason, it is possible to avoid a circumstance in which the screen of the display 51 is switched to display of the predetermined information which relates to the other machine tool 10 without any notice, and the operator does not notice the switching.

However, in a case where the operator selects the other-machine tool selection screen 70 and switches to display of the predetermined information which relates to the other machine tool 10, it is considered that the own switching is forgotten and the like. Therefore, in a case where the target of the displayed machine tool 10 is switched, such that the switching is understood, it is preferable to display some identification mark on the screen such as separating the screen by color in every piece of predetermined information on each machine tool 10. For example, for a screen background, the machine tool 10A is set as "red," the machine tool 10B is set as "blue," the machine tool 10C is set as "yellow," and the machine tool 10D is set as "green." Consequently, it is understood at a glance that in the displays 51A, 51B, and 51C which are indicated in FIG. 5, the backgrounds are respectively red, blue, and yellow, and in the displays 51A, 51B, and 51C which are indicated in FIG. 6, all of the backgrounds are blue, and the predetermined information on the machine tool 10B is displayed. In addition, in a case where operation is interrupted for a certain time, communication with another machine may be blocked and display may be returned to the main menu screen 70.

Consequently, in the present embodiment, when the operation panel 20 is operated according to the other-machine tool selection screen 70 in one machine tool 10, it is possible to acquire the predetermined information from the other machine tool 10 based on the command signal from the input section 52 and display on the own display 51 by the control devices 15 of the machine tool 10 being connected to each other by LAN. For example, in a case where the operation check of the machine tool 10B is performed, as shown in FIG. 6, the operator is able to simultaneously confirm the information with respect to the machine tool 10B by respectively displaying each individual operation screen (B1 screen), the ladder diagram screen (B2 screen), and the I/O monitor screen (B3 screen) with respect to three displays 51 which are lined up horizontally. Moreover, in the processing machine line 1, since the distance from the operator who stands in front of the machine tool 10B to the displays 51 of the left and right machine tools 10A and 10C is short, it is possible for the operator to confirm all of the three displays 51 while barely moving from the standing position.

Figure 9:
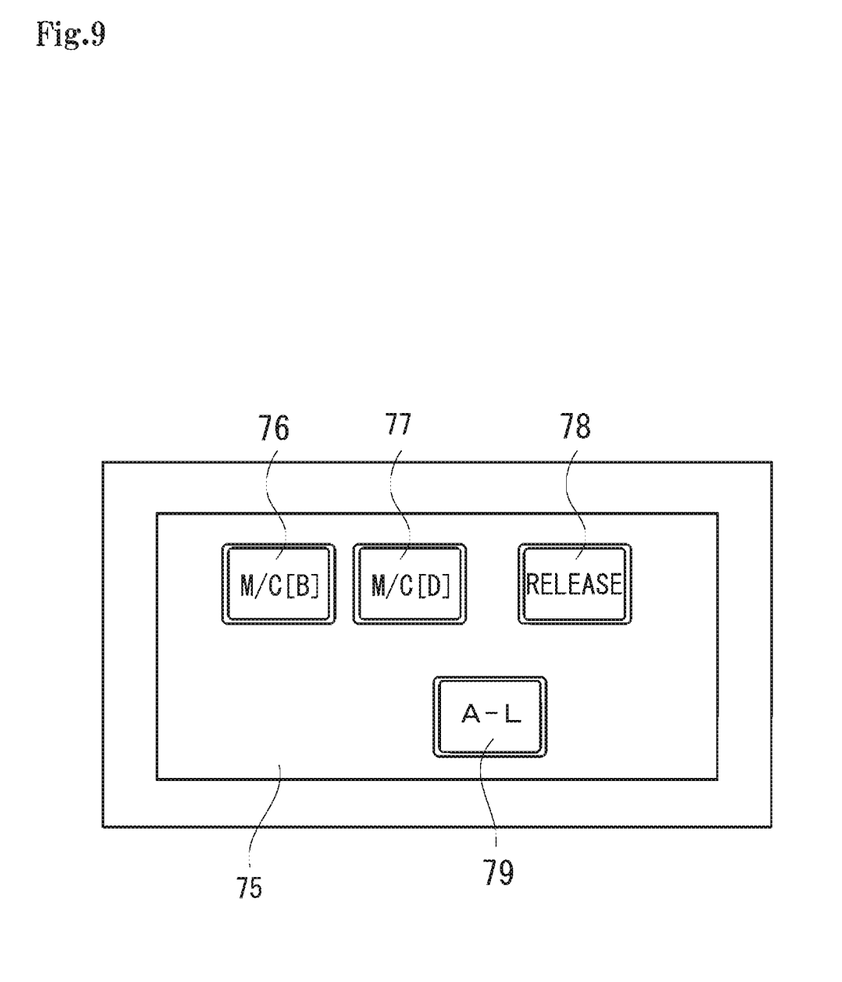
FIG. 9 is a diagram illustrating the other-machine tool selection screen which is displayed on the display of the machine tool.

In the processing machine line 1, the conveyance control device 7 of the auto loader 45 is connected to the control device 15 of each machine tool 10 via the LAN, and the processing machine line 1 is configured in a state in which communication is possible. Accordingly, although there is no dedicated display in the auto loader 45, it is possible to display the own predetermined information on the display 51 of the machine tool 10. At that time, in a case where the other-machine tool selection button 68 of the main menu screen 60 which is shown in FIG. 7 is selected on the display 51 of the operation panel 20, an other-machine tool selection screen 75 which is shown in FIG. 9 is displayed. In addition to other-machine tool selection buttons 76 and 77, and a release button 78, an auto loader selection button 79 is set on the other-machine tool selection screen 75.

The main menu screen is displayed on the display 51 in order to select the predetermined information which relates to the auto loader 45 and the predetermined information screen of the auto loader is displayed on the display 51 due to a transition operation of the operator by selecting the auto loader selection button 79. Since the processing machine line 1 has an extraordinarily compact configuration, it is not possible to provide an auto loader dedicated operation panel. However, in the present embodiment, the defect is resolved by using the operation panel 20 of the machine tool 10. Then, it is possible to simplify the configuration of the processing machine line 1 and it is possible to reduce costs due to the auto loader dedicated operation panel being unnecessary.

Here, in the embodiment, the processing machine line 1 is indicated in which the operation panel 20 is mounted on all of the four machine tools 10. However, the operation panel 20 may be configured to be attachable and detachable, and in a necessary state, may be reattached to a specific machine tool 10. Thereby, it is possible to further simplify the processing machine line 1 and it is possible to reduce costs. At that time, for example, in the processing machine line 1, the operation panel 20 is ordinarily mounted on the machine tools 10A and 10C. Concerning the machine tools 10B and 10D, it is sufficient if the operation panel 20 is used which is mounted on the machine tools 10A and 10C, and the predetermined information which relates to the own machine tool from the other-machine tool selection screen 70 is displayed. Since the distances of the machine tools 10 from each other is extremely close, there is no particular problem in use by the operator. In a case where three screens are necessary such as in the operation check described above, the operation panel may be brought from another and mounted.

An embodiment of the present disclosure is described above, but the present disclosure is not limited thereto, and various modifications are possible within a range which does not depart from the gist of the present disclosure.

For example, in the embodiment, all of the machine tools 10 which configure the processing machine line 1 are described as the same type, but a portion or all of the machine tools may be different.

In addition, a case where the processing machine line 1 is configured by four machine tools 10 is described, but as long as there are two or more, the number is not limited. Then, the disposition of each machine tool is not particularly limited as long as the advantage of the disclosure can be realized.

In addition, in the embodiment, the operation check of the machine tool is described as a utilization example of the present disclosure. However, in addition, it is possible to utilize various settings. In addition, a case is described in which three screens are displayed, but the display screen may be two, four, or the like.

In addition, the operation panel 20 may be set in a panel computer, and may acquire the predetermined information from the control device 15 of another machine tool 10 without using control device 15 of the mounted machine tool 10. Furthermore, the panel computer is connected using a wireless LAN, and it is preferable to be able to dispose whatever the machine tool 10 is. Consequently, it is not necessary to provide the panel computer in all of the machine tools 10 which configure the processing machine line 1.

REFERENCE SIGNS LIST

1: Processing Machine Line, 6: Hub, 7: Conveyance Control Device, 10 (10A, 10B, 10C, 10D): Machine Tool, 15: Control Device, 20: Operation Panel, 51 (51A, 51B, 51C): Display, 52: Input Section, 60: Main Menu Screen, 70: Other-Machine Tool Selection Screen

The invention claimed is:

1. A processing machine line comprising:
a first machine tool and a second machine tool which are disposed next to each other, the first machine tool including a first control device and a first display mounted on the first machine tool, the second machine tool including a second control device and a second display mounted on the second machine tool, the first control device and the second control device being connected to each other via a line concentrator, and the first display and the second display being respectively connected to the first control device and the second control device, and
a conveyance device which conveys a workpiece between the first machine tool and the second machine tool, wherein
the first control device controls the first display to display a first operation screen including information regarding the first machine tool based on information provided by the first control device, and to display a second operation screen including information regarding the second machine tool based on information provided by the second control device,
the first operation screen includes an other-machine tool selection button, and
when the first control device detects a user selection of the other-machine tool selection button on the first operation screen, the first control device controls the first display to display a first other-machine tool selection screen, the first other-machine tool selection screen including a first selection button for selecting the second operation screen of the second machine tool to display the information regarding the second machine tool, a first release button for returning from the first other-machine tool selection screen of the first machine tool to the first operation screen of the first machine tool, and a conveyance device selection button for viewing information of the conveyance device.

2. The processing machine line according to claim 1, wherein the first control device controls the first display to display the first operation screen as an initial screen.

3. The processing machine line according to claim 1, wherein respective pieces of information of the first machine tool and the second machine tool are displayed on the first display or the second display with different identification marks.

4. The processing machine line according to claim 1, wherein the second control device controls the second display to display the second operation screen including the information regarding the second machine tool based on the information provided by the second control device, and to display the first operation screen including the information regarding the first machine tool based on the information provided by the first control device.

5. The processing machine line according to claim 4, wherein when the second control device detects a user selection of the other-machine tool selection button on the second operation screen, the second control device controls the second display to display a second other-machine tool selection screen, the second other-machine tool selection screen including a second selection button for selecting the first operation screen of the first machine tool, a second release button for returning from the second other-machine tool selection screen of the second machine tool to the second operation screen of the second machine tool, and the conveyance device selection button for viewing the information of the conveyance device.

6. The processing machine line according to claim 1, wherein the first other-machine tool selection screen is positioned in a higher hierarchy than the first operation screen.

7. The processing machine line according to claim 1, wherein a conveyance control device for drive controlling the conveyance device is connected to the first control device and the second control device via the line concentrator, and the information of the conveyance device is displayed on the first display or the second display.

* * * * *